United States Patent
Chu et al.

(10) Patent No.: US 11,357,066 B2
(45) Date of Patent: Jun. 7, 2022

(54) WIRELESS COMMUNICATION APPARATUS AND WIRELESS COMMUNICATION METHODS BASED ON LINK USE CAPABILITIES OF MULTI-LINK DEVICES

(71) Applicant: NXP USA, Inc., Austin, TX (US)

(72) Inventors: Liwen Chu, San Ramon, CA (US); Rui Cao, Sunnyvale, CA (US); Hongyuan Zhang, Fremont, CA (US); Huiling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/005,888

(22) Filed: Aug. 28, 2020

(65) Prior Publication Data
US 2021/0068184 A1    Mar. 4, 2021

Related U.S. Application Data

(60) Provisional application No. 62/893,078, filed on Aug. 28, 2019.

(51) Int. Cl.
*H04W 76/15* (2018.01)
*H04W 8/24* (2009.01)
*H04W 74/08* (2009.01)
*H04W 80/08* (2009.01)

(52) U.S. Cl.
CPC ............. *H04W 76/15* (2018.02); *H04W 8/24* (2013.01); *H04W 74/0808* (2013.01); *H04W 80/08* (2013.01)

(58) Field of Classification Search
CPC ....... H04W 8/24; H04W 74/08; H04W 76/15; H04W 80/08

USPC .......................................................... 370/329
See application file for complete search history.

(56) References Cited

U.S. PATENT DOCUMENTS

| | | | | |
|---|---|---|---|---|
| 2014/0302787 | A1* | 10/2014 | Rantala | H04W 8/005 455/41.2 |
| 2016/0269932 | A1* | 9/2016 | Nemavat | H04W 28/0231 |
| 2017/0303314 | A1* | 10/2017 | Cariou | H04W 74/0808 |
| 2018/0006866 | A1* | 1/2018 | Trainin | H04W 74/002 |
| 2019/0280919 | A1* | 9/2019 | Sadeghi | H04L 41/0803 |
| 2019/0335454 | A1* | 10/2019 | Huang | H04W 72/048 |
| 2020/0037324 | A1* | 1/2020 | Chu | H04L 5/0055 |
| 2020/0351772 | A1* | 11/2020 | Homchaudhuri | H04W 48/08 |

FOREIGN PATENT DOCUMENTS

| | | | | |
|---|---|---|---|---|
| CN | WO 2021/008502 | * | 7/2020 | H04W 28/08 |

OTHER PUBLICATIONS

U.S. Appl. No. 16/911,102, "Multi-Band Sharing in a Wireless Communication System", filed Jun. 24, 2020, 18 pages.

* cited by examiner

*Primary Examiner* — Congvan Tran

(57) ABSTRACT

Examples of wireless communication based on link use capabilities of multi-link devices is disclosed. A first multi-link device receives a first physical layer conformance procedure (PLCP) protocol data unit (PPDU) on a first link from a second multi-link device and transmits a second PPDU on the second link based on a link use capability of the second multi-link device and a backoff counter counting down to a predetermined value. A first multi-link device also transmits a PPDU on the first link and the second link at a same start time based on an link idle determination and the backoff counter counting down to a predetermined value.

19 Claims, 7 Drawing Sheets

US 11,357,066 B2

WIRELESS COMMUNICATION APPARATUS AND WIRELESS COMMUNICATION METHODS BASED ON LINK USE CAPABILITIES OF MULTI-LINK DEVICES

RELATED APPLICATION

This application claims a benefit of priority to U.S. Provisional Application No. 62/893,078, entitled "Multi-band Operation: Link Share Capability and its Indication," filed Aug. 28, 2019, the contents of which are incorporated herein by reference in its entirety.

FIELD OF USE

This disclosure generally relates to wireless communication, and more particularly to wireless communication based on link use capabilities of multi-link devices.

BACKGROUND

A wireless system operating in accordance with WiFi based on the Institute of Electrical and Electronics Engineers (IEEE) 802.11 family of standards, specifically the IEEE 802.11be standard, defines a multi-link device affiliated with a plurality of mobile stations (STAs) or a plurality of access points (APs). A multi-link device affiliated with the plurality of APs is referred to as a multi-link AP device and a multi-link device affiliated with the plurality of STAs is referred to as a multi-link STA device. The multi-link device has a media access control (MAC) layer of an open systems interconnect (OSI) communication model that is shared by the two or more STAs or a MAC layer that is shared by two or more APs. Each AP of a multi-link AP device is coupled to a respective STA of a multi-link STA device via a wireless link. The wireless link allows an AP to exchange data with an STA in one of a plurality of communication bands (i.e., frequency bands).

Figure 1:
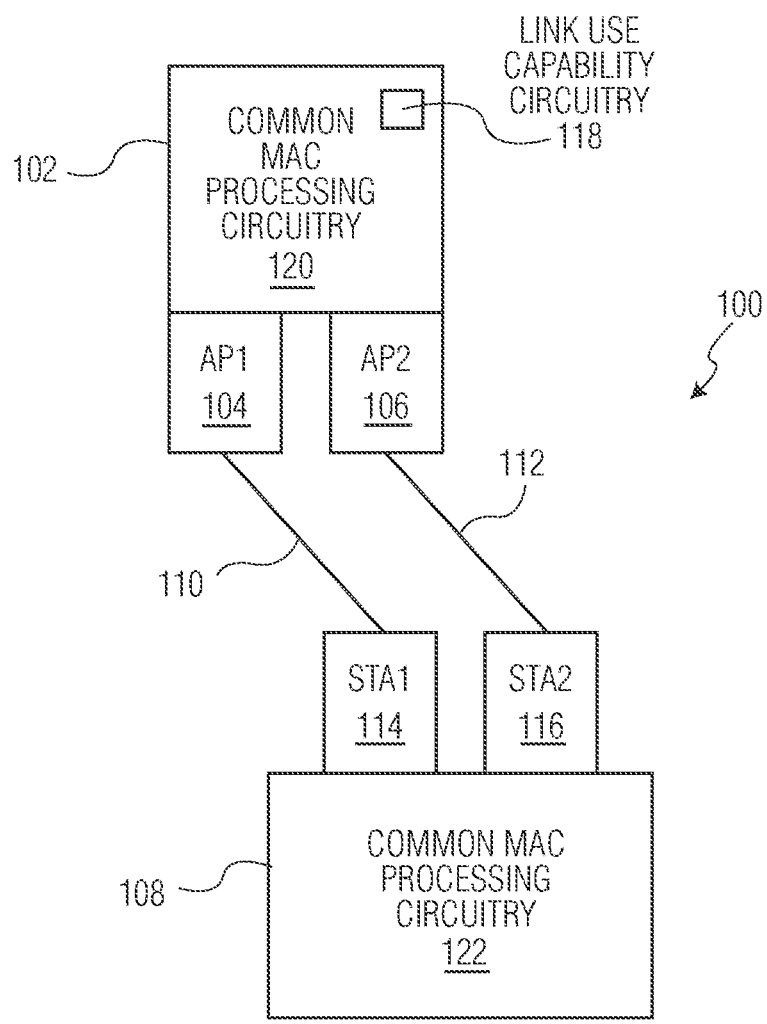
FIG. 1 is an example block diagram of a wireless network arranged with a plurality of multi-link devices in accordance with exemplary embodiments of the invention.

The drawings are for the purpose of illustrating example embodiments, but it is understood that the embodiments are not limited to the arrangements and instrumentality shown in the drawings.

DETAILED DESCRIPTION

The description that follows includes example systems, methods, techniques, and program flows associated with wireless communication based on link use capabilities of multi-link devices.

Overview

A multi-link device of the Institute of Electrical and Electronics Engineers (IEEE) 802.11 family of standards, specifically the IEEE 802.11be standard, announces link use capabilities to exchange physical layer conformance procedure (PLCP) protocol data units (PPDUs) with another multi-link device. The link use capabilities define how a multi-link device uses wireless links to communicate with the other multi-link device. The link use capabilities are typically announced in the form of a management frame (e.g., a Beacon, Probe Request, Probe Response, Association Request, or Association Response frame) exchanged during an association process between a multi-link access point (AP) device and multi-link mobile station (STA) device. The link use capabilities of a multi-link device include separate indications of support to transmit on one link concurrent with the reception on another link of a pair of links on different channels, support to transmit on one link concurrent with transmission on another link, or support to receive on one link concurrent with reception on another link. A multi-link device which receives the management frame stores an indication of the link use capability and a media access control (MAC) address of the multi-link device which sent the management frame. Then to communicate with the multi-link device which sent the management frame, the multi-link device determines the link use capability of the multi-link device based on the stored indication and the stored MAC address.

Various embodiments are directed to wireless communication based on link use capabilities of multi-link devices. In one example, a multi-link device defines a single link use capability which indicates support both to transmit on one link concurrent with the reception on another link of a pair of links and to transmit on one link concurrent with transmit on another link at different times. In another example, a multi-link device not only defines a link use capability for reception of a PPDU on one link concurrent with reception of a PPDU on another link, but a link use capability of reception of the two PPDUs at different times and separately a link use capability of reception of the two PPDUs at the same time on the two links. In yet another example, a PPDU exchanged between multi-link devices may also have one or more fields to indicate a link use capability of a multi-link device which sent the PPDU. The multi-link device does not need to determine the link use capability based on the indication of the link use capability and MAC address stored during the association process. In another example, a multi-link device is arranged to facilitate wirelessly communicating with another multi-link device while respecting a link use capability of the other multi-link entity. The link use capability that is respected includes adjusting a backoff counter of the multi-link device until the multi-link device is able to determine whether another multi-link device which receives the PPDU supports transmit on one link concurrent with the reception on another link of a pair of links. The link use capability that is respected also includes transmitting PPDUs over different links at a same time to a multi-link device which supports reception of two PPDUs that start at a same time in two links based on a backoff counter associated with one link and an idle indication. The respect of the link use capability of a multi-link device reduces errors in communication between multi-link devices. Well known instructions, protocols, structures, and techniques have not been shown in detail in order not to obfuscate the description.

Example System

FIG. 1 is an example block diagram of a wireless network 100 arranged with a plurality of multi-link devices 102, 108. In examples, the multi-link device is defined by the Institute of Electrical and Electronics Engineers (IEEE) 802.11 family of standards, specifically the IEEE 802.11be standard, which defines WiFi communications for Extra High Throughput (EHT) Wireless Local Area Networking (WLAN). The wireless network 100 shows two multi-link devices, but in other examples the wireless network 100 may include more than two multi-link devices.

The multi-link device 102 is affiliated with wireless devices in the form of a plurality of access points (APs) 104, 106 and the multi-link device 108 is affiliated with wireless devices in the form of a plurality of mobile stations (STAs) 114, 116. The plurality of APs 104, 106 of the multi-link device 102 share a common media access control (MAC) processing circuitry 120 associated with a MAC layer of an open systems interconnect (OSI) communication model. Further, each AP implements lower layers of the MAC layer and a physical layer of the OSI to facilitate wireless communication. The plurality of STAs 114, 116 of the multi-link device 108 also share a common MAC processing circuitry 122 and each STA implements lower layers of the MAC layer and a physical layer of the OSI to facilitate wireless communication. The multi-link device 102 affiliated with a plurality of APs 104, 106 is referred to as a multi-link AP device and the multi-link device 108 affiliated with a plurality of STAs 114, 116 is referred to as a multi-link STA device.

The multi-link device 102 may be coupled to the multi-link device 108 by one or more wireless links 110, 112. Each link 110, 112 may be a different wireless channel such as a 20 MHz channel on a 5 GHz or 6 GHz spectrum associated with WiFi communication. AP1 104 of multi-link device 102 may be coupled to STA1 114 of multi-link device 108 via link 110 and AP2 106 of multi-link device 102 may be coupled to STA2 116 of multi-link device 108 via link 112. One multi-link device is arranged to exchange data with another multi-link device over a respective links. Each STA and AP may include a transceiver with transmitter signal path and a receiver signal path and the transceiver may be coupled to a respective antenna. The links 110, 112 may each support bi-directional communication and the links 110, 112 may receive or transmit data at any one time.

The multi-link device 102 has link use capability circuitry 118 which facilitates wireless communication based on link use capabilities of the multi-link device 102. Similarly, multi-link device 108 may also have respective link use capability circuitry (which is not shown). In one example, the link use capability circuit 118 may be arranged to define a consolidated link use capability announcement, referred to as Link Use Capability 1. The Link Use Capability 1 announces support for both transmit of physical layer conformance procedure (PLCP) protocol data units (PPDUs) on one link concurrent with the reception of PPDUs on another link of the pair of links and transmit of PPDUs on one link concurrent with transmit of PPDUs on the other link of the pair of links with different start times. In examples, the link use capability circuitry 118 does not need to separately announce each of these link use capabilities. In another example, the link use capability circuitry 118 may be arranged to announce support to receive on one link and receive on another link of a pair of links concurrently. The announcement may include support to receive two PPDUs that overlap and start at different times, referred to as Link Use Capability 2, or support to receive two PPDUs that overlap and start at a same time, referred to as Link Use Capability 3. In yet another example, the link use capability circuit 118 may be arranged to exchange PPDUs between multi-link devices which has one or more fields associated with an indication of a link use capability of a multi-link device. In another example, the link use capability circuitry 118 may be arranged to facilitate wirelessly communicating with another multi-link device while respecting a link use capability of the other multi-link entity. The link use capability that is respected includes not transmitting a PPDU until the multi-link device is able to determine whether another multi-link device which receives the PPDU supports transmit on one link concurrent with the reception on another link of a pair of links. The link use capability that is respected also includes transmitting PPDUs over different links at a same time to a multi-link device which supports reception of two PPDUs that start at a same time in two links based on a backoff counter associated with one link and an idle indication associated with another link. The respect of the link use capability reduces errors in communication between multi-link devices. The multi-link devices 102, 108 may be implemented with analog circuitry, mixed signal circuitry, memory circuitry, logic circuitry, or processing circuitry arranged to execute code stored in a memory to perform the disclosed functions, or combinations thereof.

Figure 2:
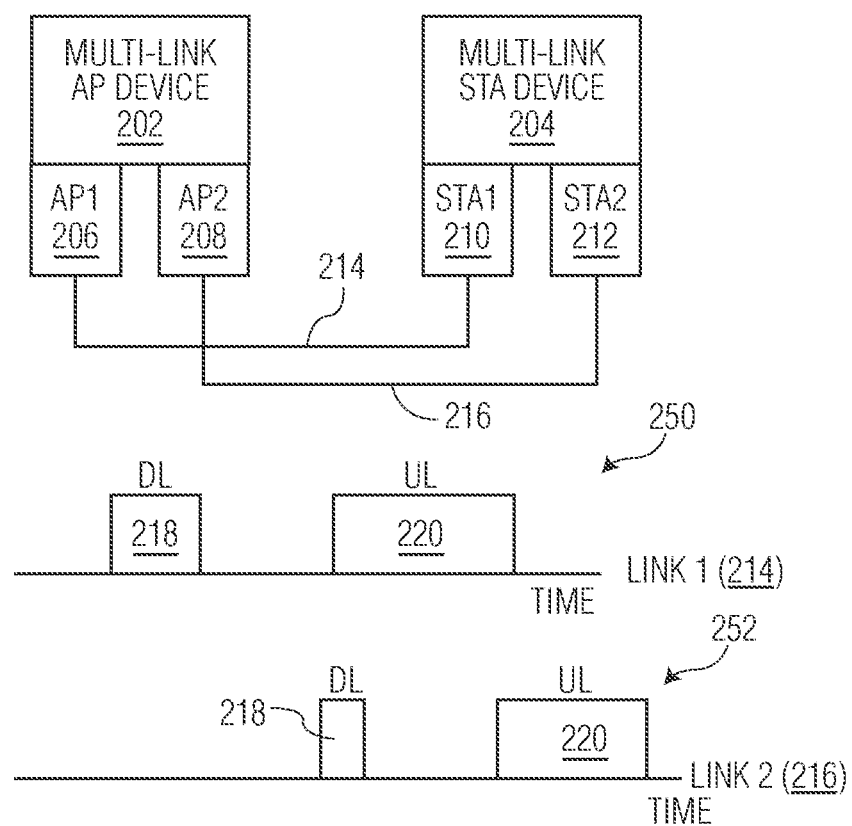
FIG. 2 illustrates examples of how a link use capability of transmit on one link and receive on another link concurrently also implies a multi-link device has a link use capability of transmit on two links concurrently at different times in an example wireless network in accordance with exemplary embodiments of the invention.

FIG. 2 illustrates how a link use capability of transmit on one link and receive on another link concurrently by a multi-link device also implies a multi-link device has a link use capability of transmit on two links concurrently in the example wireless network 100. In an example, AP1 206 affiliated with a multi-link AP device 202 may communicate with STA1 210 affiliated with a multi-link STA device 204 over a link 1 214. Similarly, AP2 208 affiliated with the multi-link AP device 202 may communicate with STA2 212 affiliated with the multi-link STA device 204 over link 2 216. In examples, PPDUs 250 may be transmitted over link 1 214 and PPDUs 252 may be transmitted over link 1 214 in accordance with IEEE 802.11. The PPDUs 250 may include a trigger frame 218 sent by AP1 206 of the multi-link AP device 202 to indicate a data rate or modulation of wireless communication over the link 1 214, for example, which triggers STA1 210 of the multi-link STA device 204 to send a PPDU 220 such as an aggregated MAC protocol data unit (A-MPDU) 220 to AP1 206 of the multi-link AP device 202. A PPDU defines a unit of information and an MPDU is a unit of information defined by the MAC Data Service. The A-MPDU improves data transmission by aggregating or grouping together several MPDUs, reducing overhead associated with transmitting MPDUs separately. The PPDUs 252 may include a trigger frame 218 sent by AP2 208 of the multi-link AP device 202 over the link 2 216 which triggers STA2 212 of the multi-link device 204 to send a PPDU 220 to AP2 208 of multi-link AP device 202.

In examples, the multi-link AP device 202 sends the trigger frame 218 to the multi-link STA device 204 as a downlink (DL) PPDU at different times on each link. In the event that the multi-link AP device 202 sends the trigger frame 218 at different times, the multi-link STA device 204 may need to transmit an A-MPDU at different times on each link as an uplink (UL) PPDU 220. Further, the multi-link STA device 204 may also need to receive the trigger frame 218 on link 2 216 at the same time it is transmitting an A-MPDU 220 on link 1 214. In order for the receive on one link to not interfere with the transmit on another link due to proximity of antennas on a multi-link device, the multi-link STA device 204 may need to be arranged with circuitry to transmit on one link concurrent with the reception on another link of a pair of links along with transmitting over the two links concurrently at different start times. In examples, the multi-link STA device 204 may be arranged to support a link use capability of transmit on one link concurrent with the reception on another link of a pair of links in the event that it also supports a link use capability of transmit over the two links concurrently at different start times, referred to as Link Use Capability 1. The indication may be in a form of an announcement during an association between the multi-link AP device 202 and the multi-link STA device 204 or in a field of a PPDU as described in further detail below. The support of Link Use Capability 1 indicates to the multi-link AP device 202 that the multi-link STA device 204 may receive and transmit a PPDU concurrently and transmit PPDUs over the two links concurrently at different start times. In examples, multi-link STA device 204 does not need to separately indicate support to transmit one link concurrent with transmission on another link or transmit on one link concurrent with the reception on another link of a pair of links because a multi-link device which supports the transmit and receive on the pair of links also needs to support the transmit concurrently on the pair of links. In other examples, a multi-link STA device may indicate support of Link Use Capability 1 instead of or in addition to the multi-link STA device 204 indicating support of Link Use Capability 1 as described above.

In some examples, the trigger frame 218 may be sent over a third link (not shown) such as a 2.4 GHz link associated with WiFi to trigger the A-MPDU 220 to be transmitted on each of link 1 214 and link 2 216 at 5 GHz or 6 GHz. In the event that the trigger frame 218 is sent over the third link, the multi-link STA device 204 may also support Link Use Capability 1.

A multi-link device may support a link use capability of receiving PPDUs on one link concurrent with receiving PPDUs on another link. In examples, this link use capability may be further defined as support for the multi-link device to receive PPDUs on one link and receive PPDUs on another link where the reception starts at a same time and separate support for the multi-link device to receive PPDUs on one link and receive PPDUs on another link where the reception does not start at a same time but overlaps.

Figure 3:
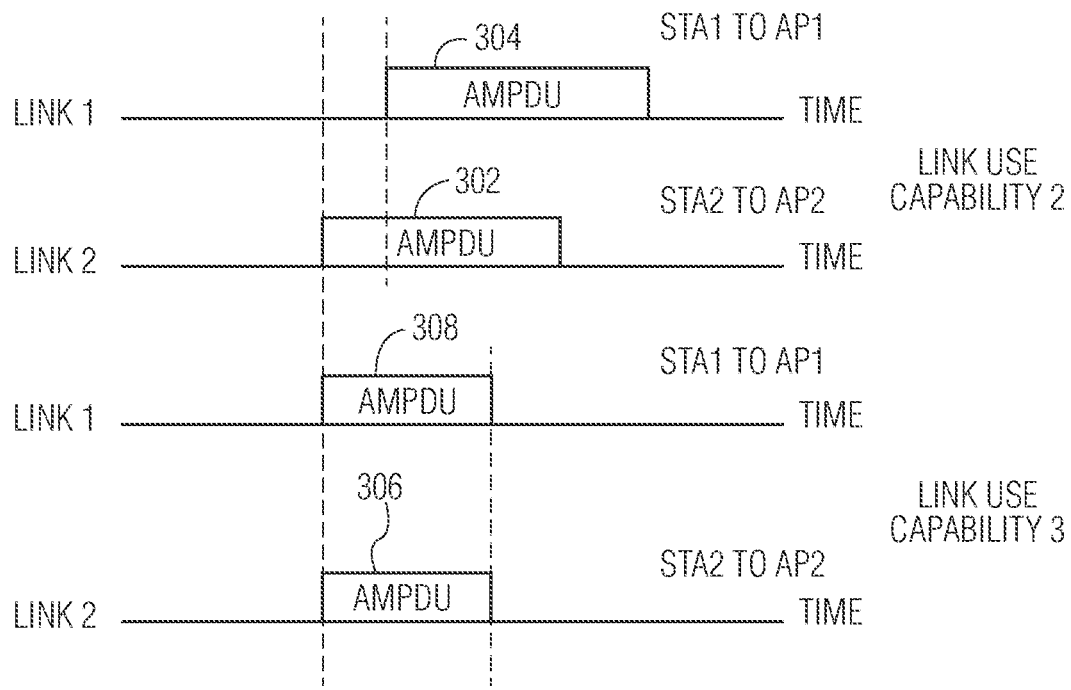
FIG. 3 illustrates examples of a physical layer conformance procedure (PLCP) protocol data unit (PPDU) exchange associated with a link use capability of reception on one link concurrent with transmission another link in accordance with exemplary embodiments of the invention.

FIG. 3 illustrates examples of a PPDU exchange associated with a link use capability of reception on one link concurrent with another link. In an example, a multi-link STA device may send a respective A-MPDU to a multi-link AP device over link 1 and link 2. AP2 may receive an A-MPDU from STA2 as shown by PPDU 302 associated with link 2 followed by AP1 receiving an A-MPDU from STA1 as shown by PPDU 304 associated with link 1. The multi-link AP device may support a link use capability of receiving two overlapped PPDUs that start at different times, referred to as Link Use Capability 2. Additionally, AP2 may receive an A-MPDU from STA2 as shown by PPDU 306 associated with link 2 and at a same time AP1 receives an A-MPDU from STA1 as shown by PPDU 308 associated with link 1. The multi-link AP device may support a link use capability of receiving two overlapped PPDUs that start at the same time, referred to as Link Use Capability 3. Further, in other examples, a multi-link STA device may indicate support of Link Use Capability 2 or Link Use Capability 3 to a multi-link AP device instead of the multi-link AP device indicating support of Link Use Capability 2 or Link Use Capability 3 as described above.

In examples, one multi-link device may announce support for one or both of receiving two overlapped PPDUs that start at different times (Link Capability 2) or receiving two overlapped PPDUs that start at the same time (Link Capability 3). The announcement may provide more information than a link use capability which indicates that a multi-link device is able to simply receive PPDUs concurrently. In one example, the announcement may be made during an association between the one multi-link device and other multi-link device and specifically in a management frame received from the other multi-link device. The association process may be a process to indicate capabilities of a multi-link device. The management frame may indicate the link use capability of the other multi-link device which may be the Link Use Capability 2 or Link Use Capability 3 of FIG. 3 or the Link Use Capability 1 of FIG. 2. The one multi-link device may store an indication of the link use capability in a memory and a MAC address of the other multi-link device which sent the announcement frame. In another example, a PPDU exchanged after the association may also announce the link use capability of the multi-link device which transmits the PPDU. The PPDU may define one or more fields which indicates the link use capability of the multi-link device which sent the PPDU along with a payload field which indicates data to transmit.

Figure 4:
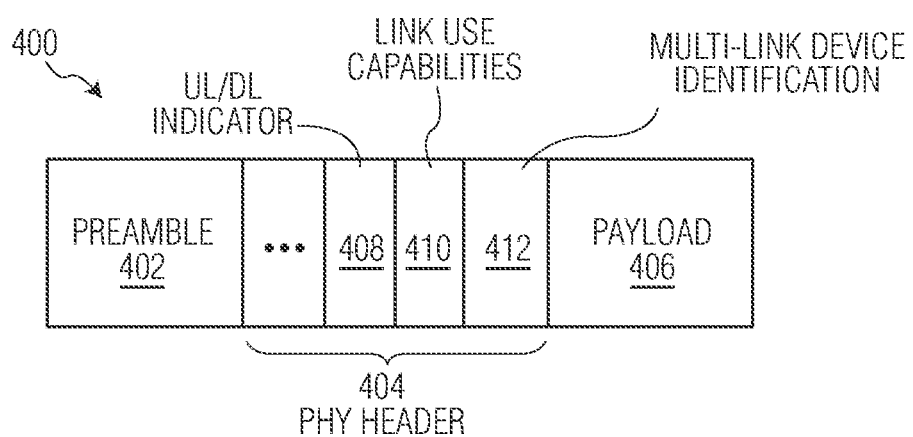
FIG. 4 illustrates an example of a PPDU which has a plurality of fields to indicate a link use capability of a multi-link device which transmits the PPDU in accordance with exemplary embodiments of the invention.

FIG. 4 illustrates an example PPDU 400 which has a plurality of fields to indicate a link use capability of a multi-link device which transmitted the PPDU. The PPDU 400 may be in a form of a trigger frame which in some examples triggers a trigger based (TB) PPDU or in the form of an A-MPDU from a receiving multi-link device. The PPDU 400 may include a preamble 402, a PHY header 404, and a payload 406. The preamble 402 allows a receiving multi-link device to obtain time and frequency synchronization and estimate channel characteristics for equalization. The PHY header 404 provides information about a configuration of the PPDU 400, such as format, data rates, etc. and the payload 406 contains data being transported including a MAC header which indicates the multi-link device which sent the PPDU 400. In examples, the link use capability of the multi-link device which transmits the PPDU 400 may be included in the PHY header 404 of the PPDU 400.

In one example, the PHY header 404 may have a uplink (UL) or downlink (DL) indicator 408 which indicates whether the PPDU 400 is associated with an uplink or downlink transmission from a multi-link device. For instance, in the event that a multi-link STA device detects a DL PPDU from a multi-link AP device that doesn't support transmit while receive (Link Use Capability 1), the multi-link STA device cannot transmit an UL PPDU to the multi-link STA device in another link. Alternatively, in the event that a multi-link AP device detects an UL PPDU from a multi-link STA device that doesn't support transmit while receive (Link Use Capability 1), the multi-link AP device cannot transmit an DL PPDU to the multi-link STA device in another link. In another example, the PHY header 404 may have a link use capability field 410 which indicates a link use capability of a multi-link device which transmitted the PPDU 400 such as Link Use Capability 1, Link Use Capability 2, or Link Use Capability 3. With the link use capabilities field 410, a multi-link device which receives the PPDU does not need to wait to receive the MAC header with the MAC address of the multi-link device which transmitted the PPDU 400. Further, the multi-link device which receives the PPDU does not need to retrieve the link use capability stored during the association and associated with the MAC address of the multi-link device which sent the PPDU to determine the link use capability of the multi-link device which sent the PPDU 400. Instead, the link use capabilities field 410 of the PPDU 500 will indicate the link use capability of the multi-link device which sent the PPDU. The indication of the link use capability in the link use capabilities field 410 reduces an amount of time to determine the link use capability of the multi-link device which sent the PPDU. In yet another example, the PHY header 404 may have a multi-link device identification 412 such as an association identifier (AID) or partial AID which identifies the AP or STA which transmitted the PPDU 400. The multi-link device which receives the PPDU does not need to determine the multi-link device which transmitted the PPDU 400 by waiting to receive the MAC header with the MAC address of the multi-link device which transmitted the PPDU 400. Further, the multi-link device identification 512 may not be coded with other fields of the PPDU 400 in examples.

In examples, a one multi-link device may respect a link use capability of another multi-link device. The respect may be for the one multi-link device not transmit the PPDU until a link use capability of the other multi-link device is determined. By respecting the link use capability, the other multi-link device may receive the transmitted frames without error.

Figure 5:
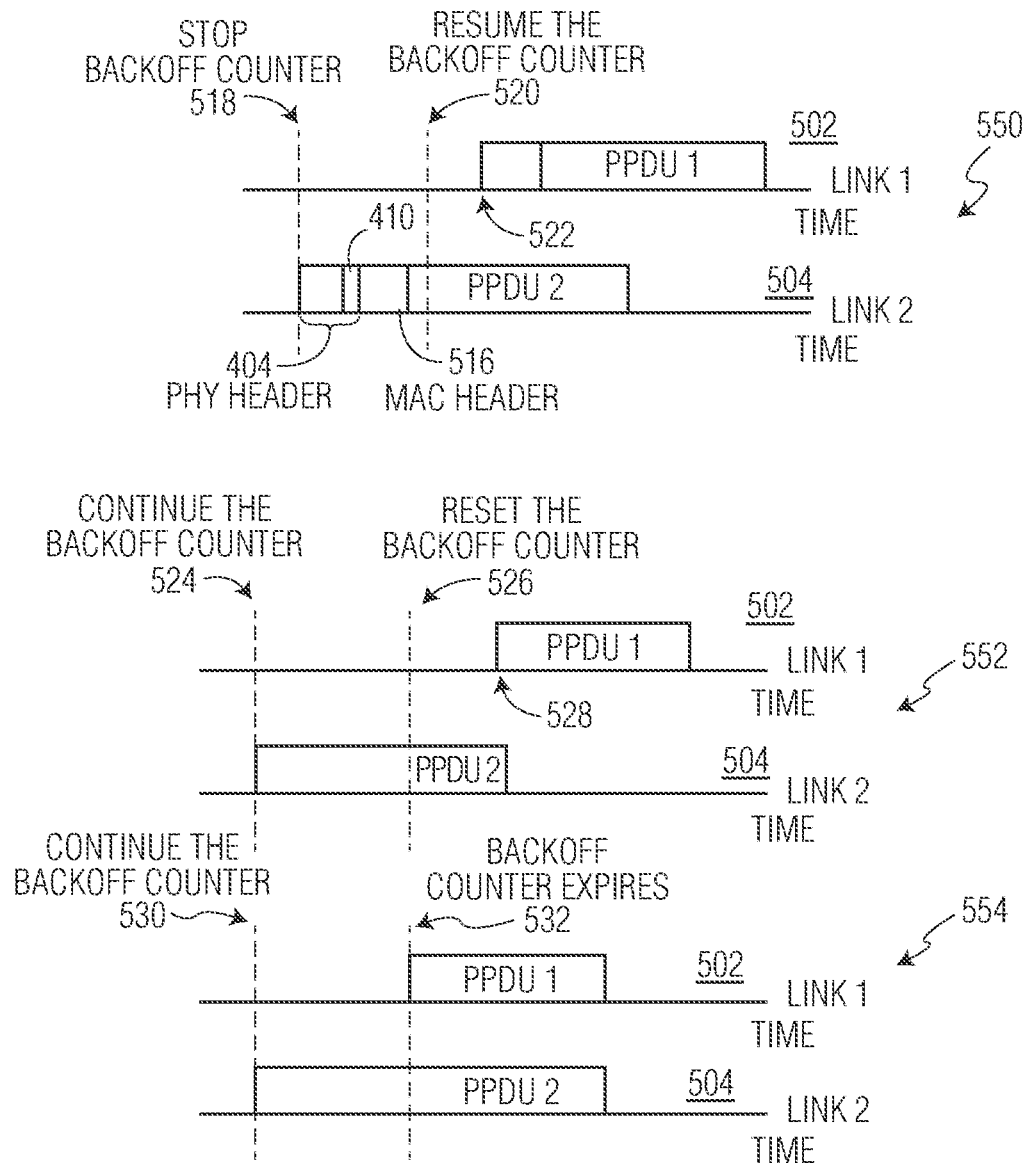
FIG. 5 illustrates an example PPDU exchange which respects a link use capability of a multi-link device in accordance with exemplary embodiments of the invention.

FIG. 5 illustrates various example PPDU exchanges 550, 552, 554 which respect a link use capability of a multi-link device. In an example, an AP2 of a multi-link AP device may receive a PPDU on link 2 referred to as PPDU2 504 from a multi-link STA device. An AP1 of the multi-link AP device may also be arranged to transmit a PPDU on link 1 referred to as PPDU1 502 to the multi-link STA device. The PPDU2 504 may have a PHY header 404 followed by a MAC header 516. The PHY header 404 may indicate timing information and the MAC header 516 may indicate a MAC address of the certain multi-link STA device which sends the PPDU2. In order to transmit the PPDU1 502 and respect a link use capability of the multi-link STA device which transmits the PPDU 504, the multi-link AP device may determine whether the multi-link STA device supports Link Use Capability 1. Until this is determined, the multi-link AP device may delay transmitting the PPDU1 502.

In one example, the multi-link AP device may store an indication of the MAC address of the multi-link STA device which transmitted the PPDU2 504 and its link use capability during the association between the multi-link AP device and the multi-link STA device. After the MAC address of the multi-link STA device which transmitted the PPDU2 504 is received in the MAC header 516, the multi-link AP device may determine the link use capability of the multi-link STA device. In the event that the multi-link STA device has Link Use Capability 1, PPDU1 502 is transmitted. Otherwise, the transmission is cancelled. In another example, the multi-link AP device may determine the link use capability of the multi-link STA device based on the link use capabilities field 410 in the PHY header 404 of the PPDU2 504. In the event that the multi-link STA device has Link Use Capability 1, PPDU1 502 is transmitted. Otherwise, the transmission is cancelled.

The multi-link AP device may delay transmitting the PPDU1 502 in many ways until the link use capability of the multi-link STA device is determined. The AP1 may normally perform a backoff procedure before transmitting the PPDU1 502. The backoff procedure may be in a form of a backoff counter which starts at a value and counts down as one or more idle slots on the link are detected until the backoff counter reaches a predetermined value such as zero. When the backoff counter reaches zero, the AP1 may transmit the PPDU1 502 in a next transmit opportunity (TXOP). The examples below describe the backoff counter counting down to zero, but in other examples, the backoff counter may count up to a predetermined value with no loss of generality. In examples, the backoff counter may be associated with link 1.

In the example PPDU exchange 550, the multi-link AP device may stop the backoff counter at 518 until the link use capability of the multi-link STA device which transmitted the PPDU1 502 is determined. After the link use capability of the multi-link STA device which transmitted the PPDU1 502 is determined, then at 520, a count of the backoff counter may resume in the event that the multi-link STA device which sent the PPDU1 502 supports transmit while receive capability (Link Use Capability 1). At 522, the backoff counter may reach zero and the PPDU1 502 is transmitted. Otherwise, the PPDU1 502 transmission is canceled.

In the example PPDU exchange 552, the multi-link AP device may not stop the backoff counter at 524 and the backoff counter may continue to count down. In the event that the backoff counter reaches zero, the backoff counter is reset at 526 so that the PPDU1 502 is not transmitted. The backoff counter may be reset by adjusting a value of the backoff counter from which the backoff counter counts down from and then the backoff counter is started to count down. The backoff counter may be reset and started one or more times in the event that the backoff counter reaches zero until the link use capability of the multi-link STA device which transmitted the PPDU1 502 is determined. In the event that the multi-link AP device determines that the multi-link STA device supports transmit while receive capability (Link Use Capability 1), the PPDU1 502 is transmitted at 528 when the backoff counter reaches zero. Otherwise, the PPDU1 502 transmission is canceled.

In the example PPDU exchange 554, the multi-link AP device may not stop the backoff counter at 530. The backoff counter may count down. In the event that the multi-link AP device is able to determine that the link use capability of the multi-link STA device which transmitted the PPDU 504 does not have transmit while receive capability (Link Use Capability 1) and the backoff counter is zero, then the PPDU1 502 transmission is cancelled. In the event that the multi-link AP device is able to determine that the multi-link STA which transmitted the PPDU1 504 has transmit while receive capability (Link Use Capability 1) and the backoff counter is zero, then the PPDU1 502 is transmitted at 532 to the multi-link STA device which transmitted the PPDU1 504. Also, in the event that the multi-link AP device is not able to determine that the multi-link STA device which transmitted the PPDU1 502 has Link Share Capability 1 and the backoff counter is zero, then the PPDU1 502 is transmitted at 532 to the multi-link STA device which transmitted the PPDU1 504. In this way, a best effort is taken in view of the backoff counter reaching zero to respect the link use capability of the multi-link AP to which the PPDU1 502 is transmitted.

In other examples, the multi-link AP device may also transmit the PPDU1 502 to the multi-link STA device in the event that the multi-link device which transmitted PPDU2 504 is not the same device as the multi-link STA device which receives the PPDU1 504. In the event that the multi-link device which transmitted PPDU2 504 is in a different basic service set (BSS) as the multi-link STA device which receives the PPDU1 504, the multi-link device which transmitted PPDU2 504 is not the same as the multi-link STA device which receives the PPDU1 504. The association identifier or MAC address associated with PPDU1 502 may indicate the multi-link device which sent the PPDU1 502. Further, in other examples, an STA2 of a multi-link STA device may receive a PPDU2 on link 2 from a multi-link AP device and an STA1 may determine whether to transmit a PPDU1 on link 1 to the multi-link AP device as described above, instead an AP2 of a multi-link AP device receiving PPDU2 504 on link 2 from a multi-link STA device and an AP1 of the multi-link AP device determining whether to transmit a PPDU1 502 on link 1 to the multi-link STA device.

In other examples, a transmitting multi-link device may be arranged to transmit a PPDU1 in link 1 and concurrently at a different time transmit a PPDU2 in link 2. The multi-link device may transmit PPDU2 based on its link use capability or a link use capability of a receiving multi-link device which receives PPDU2. For example, the transmitting multi-link device may transmit PPDU1 and then PPDU2 only in the event that it supports transmit and receive capability (Link Use Capability 1) so that it is able to solicit a response to the PPDU2 such as a block acknowledgement from the receiving multi-link device. As another example, the transmitting multi-link device may transmit PPDU1 and then PPDU2 only in the event that a receiving multi-link device supports transmit and receive capability (Link Use Capability 1) so that the receiving multi-link device is able to provide a response such as a block acknowledgement to the PPDU2. In this regard, the multi-link device which transmits PPDU1 may need to consider one or more of its link use capabilities before transmitting PPDU2 or link use capabilities of a receiving multi-link device before transmitting PPDU2 to reduce errors in the communication.

In examples, a first multi-link device may transmit two triggers on separate links at a same start time and two TB PPDUs on separate links at a same start time. The triggers and the PPDUs are transmitted at a same start time and a same length in the event that the first multi-link device which transmits the PPDUs and a second multi-link device which receives the PPDUs do not support Link Use Capability 1 and supports Link Use Capability 3.

Figure 6:
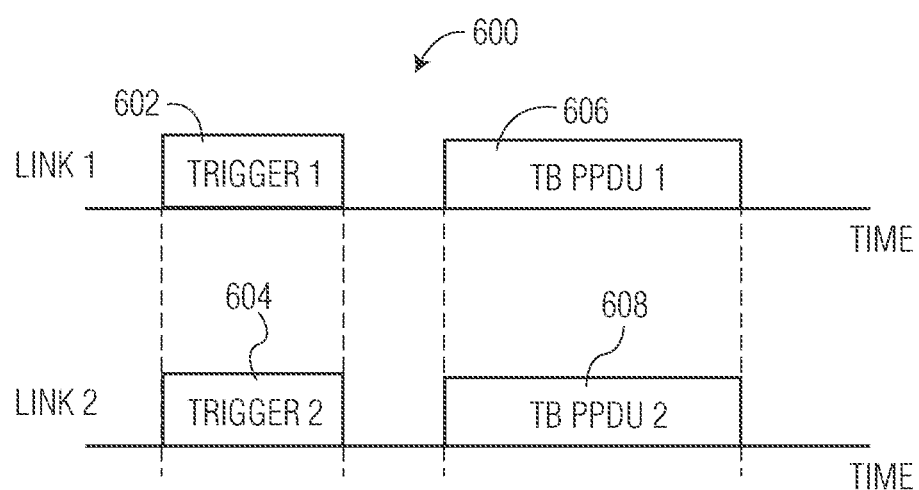
FIG. 6 illustrates an example PPDU exchange associated with a link use capability of reception on one link at a same time as reception on another link in accordance with exemplary embodiments of the invention

FIG. 6. illustrates an arrangement of PPDUs 600 when a first multi-link device and a second multi-link device does not support Link Use Capability 1 and supports receiving two PPDUs at a same time (Link Use Capability 3). The first multi-link device may transmit trigger 1 602 on link 1 and trigger 2 604 on link 2 by respective STAs or APs. The triggers may need to have a same length and be transmitted at a same time because the second multi-link device which receives the PPDUs does not support Link Use Capability 1. The second multi-link device may transmit a TB PPDU1 606 such as an A-MPDU1 on link 1 and a TB PPDU2 608 such as an A-MPDU2 on link 2 by respective STAs or APs. The TB PPDUs may have a same length and be transmitted at a same time because the first multi-link entity does not support Link Use Capability 1. A multi-link device may coordinate the transmission at the same time over the two links based on an access procedure to access the two links.

In one example access procedure, a transmitting multi-link device is coupled to a first link and a second link via respective wireless devices. The first link and the second link may be associated with a respective backoff counter which counts down. The backoff counters may be used to determine whether to transmit the PPDUs at a same time over the two links by respective STAs or APs. For instance, in the event that the backoff counter associated with the first link is zero, the first link may be idle. The backoff counter associated with the second link may be stopped. The wireless device associated with the first link may then invite the wireless device associated with the second link to transmit a PPDU in a respective TXOP associated with each link. The invitation as described herein may comprise the wireless device associated with the first link determining whether the invited wireless device has an idle link, which in this example is the second link. With the first link and the second link of the transmitting multi-link AP being idle, the PPDUs may be transmitted at a same time over the first link and the second link in a respective TXOP of the links. In the event that the backoff counter associated with the first link is zero and the second link is not idle, a PPDU may be transmitted over the first link in a next TXOP of the first link and not over the second link.

The determination of whether a link is idle (e.g., second link is idle in this example since the backoff counter associated with the first link is zero indicating it is idle) may be determined in many ways. A link may have multiple channels including a primary channel and one or more secondary channels. A channel may define a frequency range for transmitting a PPDU. In examples, a link may have a primary 20 MHz channel and three secondary 20 MHz channels to define a bandwidth of 80 MHz for the link. In one example, the multi-link device may check to see whether one or more of the primary and secondary channels of a link are idle for a point coordination function (PCF) interframe space (PIFS) time after a backoff counter (associated with the first link in this example) is zero, such as 30 ms. A channel which is idle for a PIFS time after the backoff counter reaches zero defines an idle slot for the channel. In the event that the channel has an idle slot, the link is idle and the channel is used to transmit the PPDU in a next TXOP. In the event that the channel does not have an idle slot, the channel is not used to transmit the PPDU. Further, in the event that none of the channels have an idle slot, then the link is not idle. In another example, the primary channel of a link may be separately checked to be idle based on one or more of network allocation vector (NAV) checking and a clear channel assessment (CCA) rather than the PIFS checking. The NAV checking may confirm that the primary channel is available for a duration of the PPDU transmission based on a medium reservation. The CCA may determine whether the primary channel is not idle based on another PPDU detected on the channel. In the event that the primary channel is idle based on the NAV and CCA checking, the link is idle. In the event that a secondary channel is idle based on the PIFS checking, the link is idle.

After the transmission on the first link and the second link and in a backoff procedure, the backoff counter associated with the first link which is zero is reset. In examples, the backoff counter associated with the first link may be reset to a random value Then, the backoff counter associated with the first link and second link is started. In the event that the backoff counter associated with the second link counts down to zero, the wireless device associated with the second link may responsively invite the wireless device associated with the first link to transmit PPDUs and a PPDU transmitted on both links if both links are idle. In the event that the backoff counter associated with the first link is not idle, a PPDU may be transmitted over the second link in a next TXOP of the first link and not over the first link. The backoff counter associated with the second link may then be reset in another backoff procedure. The reset may comprise adjusting a value of the backoff counter when the backoff counter was stopped with another value such as a random value. The backoff counter may then count down from the adjusted value.

To illustrate, a first link may have a back off counter which has a value of 0 when the second link has a backoff counter with a value of 3. The backoff counter associated with the second link is stopped. The wireless device associated with the first link invites the wireless device associated with the second link to do a PPDU transmission in a TXOP for each link. In a backoff procedure, the backoff counter associated with the first link is set with a random value to reset the backoff counter and the backoff counter associated with the second link is started from 3. In the event that the backoff counter of the second link becomes 0, the wireless device associated with the second link can invite the wireless device associated with the first link to either do a simultaneous transmission on both links in a TXOP for each link (if both links are idle) or do a transmission in the second link only in a TXOP (if the first link is not idle). In another backoff procedure, the backoff counter associated with the second link is reset. The reset may comprising setting the backoff counter associated with the second link to a random value adjusted by the value of the backoff counter such as 3 when the backoff counter was earlier stopped.

In another example access procedure, a transmitting multi-link device is coupled to a first link and a second link via respective wireless devices and a wireless device associated with a first link having a backoff counter which counts down to zero first does not necessarily invite a wireless device associated with a second link to transmit a PPDU. Instead, the wireless device associated with the second link having a backoff counter which counts down to zero (after the wireless device associated with the first link having the backoff counter which counts down to zero) invites the wireless device associated with the second link to transmit a PPDU. The link which is invited toggles to reduce a chance that a wireless device associated with same first link which is frequently idle invites a wireless device associated with a same second link which is frequently busy to transmit a PPDU. In one example, in the event that a backoff counter associated the first link counts down to zero and the second link is idle, the two links are used to transmit the PPDUs that start at the same time in a next TXOP. Then, in a backoff procedure, the backoff counter of the first link may be adjusted so that it is no longer zero. In the event that the backoff counter associated with first link counts down to zero, the two links may not be combined to transmit PPDUs at the same time (single PPDU in link 1 can still be transmitted) until a backoff counter associated with the second link counts down to zero. The wireless device associated with the second link may then invite the wireless device associated with the first link to transmit PPDUs at the same time. The first link and the second link (if idle) may transmit PPDUs at the same time in a next TXOP. In another example, in the event that a backoff counter associated with second link counts down to zero and the first link is idle, the two links are used to transmit the PPDUs that start at the same time. Then, in another backoff procedure, the backoff counter of the second link may be adjusted so that it is no longer zero. In the event that the backoff counter associated with the second link is zero, the two links may not be combined to transmit PPDUs at the same time (single PPDU in link 2 can still be transmitted) until a backoff counter associated with first link counts down to zero. The wireless device associated with the first link may then invite the wireless device associated with the second link to transmit PPDUs at the same time. The first link and the second link (if idle) may transmit PPDUs at the same time in a next TXOP.

In yet another example access procedure, a transmitting multi-link device is coupled to a first link and a second link via respective wireless devices. A backoff counter associated with a link may be zero and the multi-link device may not reset the backoff counter and may not transmit a PPDU over the link. The multi-link device may be configured with a setting to not transmit or transmit a PPDU over the link. The setting may be enabled or disabled.

In another example access procedure, a transmitting multi-link device is coupled to a first link and a second link via respective wireless devices. The multi-link device may not transmit a PPDU when the backoff counter of the first link is zero while the backoff counter of the second link is not zero. Instead, the backoff counter of the first link may be reset or remain at zero. In the event that the backoff counter associated with the second link is zero and the backoff counter associated with the first link is zero, the multi-link device transmits PPDUs over the first link and second link simultaneously in a TXOP associated with each link (e.g., after the wireless device associated with the one link invites the wireless device associated with another link to transmit). In other words, when both the backoff counters counts are zero, the multi-link device starts the simultaneous transmission over the first link and the second link.

Figure 7:
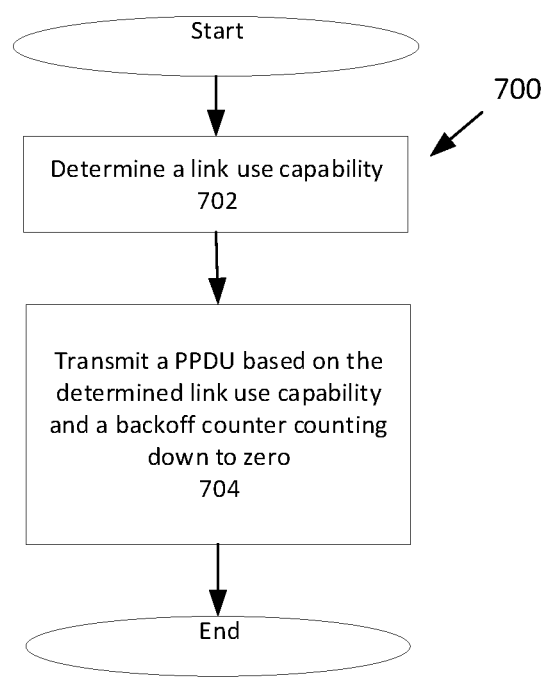
FIG. 7 is an example flow chart of functions associated with a multi-link device which wirelessly communicates based on link use capabilities in accordance with exemplary embodiments of the invention.

FIG. 7 is an example flow chart of functions 700 associated with a multi-link device which wirelessly communicates based on link use capabilities. A multi-link device may perform the functions 700 using analog circuitry, mix signal circuitry, memory circuitry, logic circuitry, or processing circuitry arranged to execute code stored in a memory and when executed by the processing circuitry may implement the disclosed functions, or combinations thereof.

At 702, the first multi-link device determines a link use capability of a second multi-link device. In examples, each multi-link device may have two wireless devices coupled to respective links. In examples, the link use capability may indicate whether a multi-link device supports Link Use Capability 1 and the first multi-link device may transmit a PPDU to the second multi-link device based on a backoff counter in the event that the second multi-link device supports Link Use Capability 1. In examples, the first multi-link device may determine a link use capability of the second multi-link device based on a PPDU received from the second multi-link device with a PHY header that indicates the link use capability of the second multi-link device. Among others, the link use capability may indicate one or more of a consolidated link use capability which announces support to transmit on one link concurrent with the reception on another link of a pair of links and support to transmit on one link concurrent with transmit on another link with different start times. In another example, a second multi-link device may not only announce support for reception of two PPDUs that overlap, but reception of two overlapped PPDUs that start at different times in the two links (Link Use Capability 2) or start at the same time in the two links (Link Use Capability 3).

At 704, the first multi-link device transmits the PPDU based on the determined link use capabilities of the first multi-link device or the second multi-link device and the backoff counter counting down to zero. In one example, the PPDU is transmitted over link 1 to the second multi-link device based on another PPDU received over link 2 from the second multi-link device, a determination that the second multi-link device supports Link Use Capability 1, and a backoff counter counting down to zero. In another example, a wireless device associated with a first link and a backoff counter which counts down to zero may indicate whether a wireless device associated with a second link is to be then invited to transmit when the first multi-link device and second multi-link device does not support Link Use Capability 1, but is capable of transmitting PPDUs at a same time in accordance with Link Use Capability 3. In yet another example, a backoff counter associated with both links may be used to determine whether to transmit PPDUs over link 1 and link 2 in the event that the first multi-link device and second multi-link device does not support Link Use Capability 1, but is capable of transmitting PPDUs at a same time in accordance with Link Use Capability 3.

Figure 8:
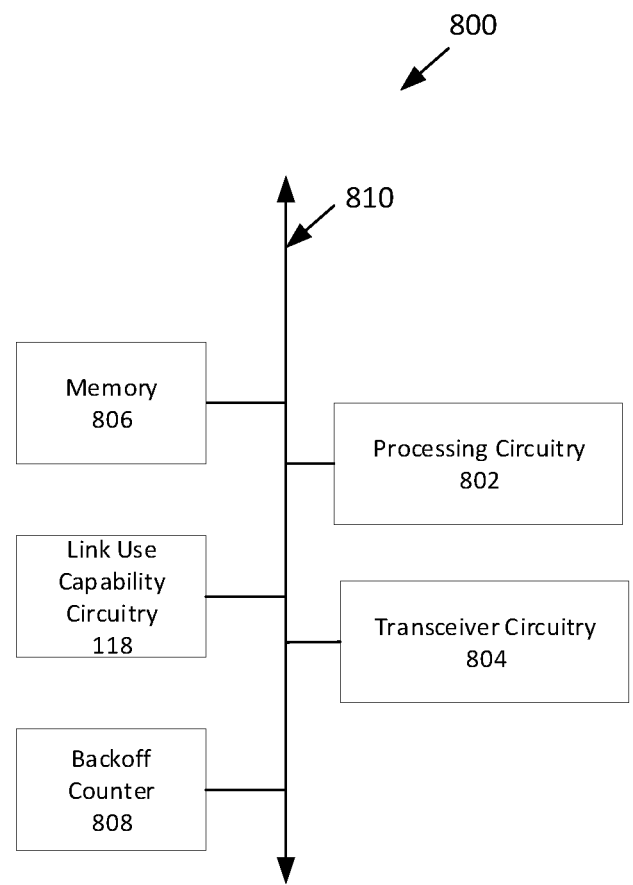
FIG. 8 is an example system diagram of a multi-link device which wirelessly communicates based on link use capabilities in accordance with exemplary embodiments of the invention.

FIG. 8 is an example system diagram of a multi-link device which wirelessly communicates based on link use capabilities. The system diagram shows a device 800 which may be a wireless communication device such as the multi-link device capable of providing communications consistent with the standards and protocols described herein. Processing circuitry 802 along with the link use capability circuitry 118 may comprise control circuitry that effects the processing described herein to transmit on wireless links based on link use capabilities of a multi-link device. Transceiver circuitry 804 may transmit and/or receive PPDUs as described herein and take the form of one or more STAs or APs with antenna circuitry to transmit or receive PPDUs over a wireless link. Memory 806 may be used to store instructions to effect the processing described herein such as the common MAC layer. The backoff counter 808 may be used to determine whether to transmit a PPDU over the wireless link and in examples, the device 800 may have one or more backoff counters 808. The processing circuitry 802, the transceiver circuitry 804, and the memory 806 may be coupled to an interconnect 810 such as a bus (e.g., PCI, ISA, PCI-Express).

In one embodiment, a method is disclosed. The method comprises: receiving, by a first multi-link device, a first physical layer conformance procedure (PLCP) protocol data unit (PPDU) over a first link from a second multi-link device; controlling, by the first multi-link device, a backoff counter associated with a second link based on the received first PPDU; determining, by the first multi-link device, that the second multi-link device which transmitted the first PPDU is arranged to transmit on a second link concurrent with reception on the first link; detecting, by the first multi-link device, the backoff counter associated with the second link reaches a predetermined value after the determination that the second multi-link device which transmitted the first PPDU is arranged to transmit on the second link concurrent with reception on the first link; and transmitting, by the first multi-link device, a second PPDU on the second link to the second multi-link device based on the determination and the backoff counter reaching the predetermined value. In an embodiment, controlling the backoff counter comprises stopping the backoff counter; the method further comprising resuming the backoff counter based on the determination that the multi-link device which transmitted the first PPDU is arranged to transmit on the second link concurrent with reception on the first link. In an embodiment, controlling the backoff counter comprises resetting the backoff counter after the backoff counter reaches the predetermined value and before the determination that the multi-link device which transmitted the first PPDU is arranged to transmit on the second link concurrent with reception on the first link. In an embodiment, controlling the backoff counter comprises not stopping the backoff counter; the method further comprising: detecting, by the first multi-link device, the backoff counter associated with the second link reaches the predetermined value before the determination that the second multi-link device which transmitted the PPDU is arranged to transmit on the second link concurrent with reception on the first link; and transmitting, by the first multi-link device, the second PPDU on the second link based on the backoff counter associated with the second link reaching the predetermined value and before the determination that the second multi-link device which transmitted the first PPDU is arranged to transmit on the second link concurrent with reception on the first link. In an embodiment, the first PPDU comprises a plurality of fields in a physical header of the first PPDU, the plurality of fields including a link use capability of the first multi-link device. In an embodiment, the link use capability is a single link use capability that indicates support for both transmit on the first link concurrent with the reception on the second link and transmit on the first link concurrent with transmit on the second link with different start times. In an embodiment, the plurality of fields further comprises an uplink or downlink indication associated with the first PPDU. In an embodiment, the plurality of fields further comprises an association identification or partial association identification of an access point or mobile station associated with the first multi-link device which transmitted the first PPDU.

In another embodiment, a method is disclosed. The method comprises determining, by a first multi-link device, that a second multi-link device is arranged to receive a first PPDU over a first link and a second PPDU over a second link that start at a same time; determining, by the first multi-link device, that a backoff counter associated with the first link reaches a predetermined value; determining, by the first multi-link device, that the second link is idle in response to the determination that the backoff counter associated with the first link reaches the predetermined value; and transmitting, by the first multi-link device to the second multi-link device, the first PPDU over the first link and the second PPDU over the second link that start at the same time based on the determination that the backoff counter associated with the first link reaches the predetermined value and the determination that the second link is idle. In an embodiment, the method further comprises determining that the second link is idle based on a channel of the second link being idle after a point coordination function (PCF) interframe space (PIFS) time from the backoff counter associated with the first link reaching the predetermined value. In an embodiment, the method further comprises determining that the second link is idle based on a network allocation vector (NAV) checking or a clear channel assessment (CCA) of a channel of the second link. In an embodiment, the method further comprises after the transmission: determining that the backoff counter associated with the first link reaches the predetermined value; determining that the backoff counter associated with the second link reaches the predetermined value after the backoff counter associated with the first link reaches the predetermined value; determining that the first link is idle in response to the determination that the backoff counter associated with the second link reaches the predetermined value; and transmitting the first PPDU over the first link and the second PPDU over the second link that start at the same time based on the determination that the backoff counter associated with the second link reaches the predetermined value and the determination that the first link is idle. In an embodiment, the method further comprises determining that the second link is not idle based on the determination that the backoff counter associated with the first link reaches the predetermined value; and transmitting the first PPDU over the first link and not transmitting the second PPDU over the second link based on the determination that the second link is not idle.

In yet another embodiment, a first multi-link device is disclosed. The first multi-link device comprises: a first wireless device coupled to a first link; a second first wireless device coupled to a second link; link use capability circuitry configured to determine that a second multi-link device is arranged to receive a first PPDU over the first link and a second PPDU over the second link that start at a same time; determine that a backoff counter associated with the first link reaches a predetermined value; and determine that the second link is idle in response to the determination that the backoff counter associated with the first link reaches the predetermined value; and the first wireless device comprising circuitry to transmit to the second multi-link device the first PPDU over the first link and the second PPDU over the second link that start at the same time based on the determination that the backoff counter associated with the first link reaches the predetermined value and the determination that the second link is idle. In an embodiment, the link use capability circuitry is further configured to determine that the second link is idle based on a channel of the second link being idle after a point coordination function interframe space (PIFS) time from the backoff counter reaching the predetermined value. In an embodiment, the link use capability circuitry is further configured to determine that the second link is idle based on a network allocation vector (NAV) checking or a clear channel assessment (CCA) of a channel of the second link. In an embodiment, the link use capability circuitry is further configured to after the transmission: determine that the backoff counter associated with the first link reaches the predetermined value; determine that the backoff counter associated with the second link reaches the predetermined value after the backoff counter associated with the first link reaches the predetermined value; determine that the first link is idle in response to the determination that the backoff counter associated with the second link reaches the predetermined value; and transmit the first PPDU over the first link and the second PPDU over the second link that start at the same time based on the determination that the backoff counter associated with the second link reaches the predetermined value and the determination that the first link is idle.

In another embodiment, a method is disclosed. The method comprises determining, by a first multi-link device, that a second multi-link device is arranged to receive a first PPDU over a first link and a second PPDU over a second link that start at a same time; determining, by the first multi-link device, that a backoff counter associated with the first link reaches a predetermined value; determining, by the first multi-link device, that a backoff counter associated with the second link reaches a predetermined value; and transmitting, by the first multi-link device, the first PPDU over the first link and the second PPDU over the second link that start at the same time in response to the respective backoff counter of the first link and the second link reaching the predetermined value. In an embodiment, the method further comprises determining that the backoff counter associated with the second link has not reached the predetermined value when the backoff counter associated with the first link reaches the predetermined value; and resetting the backoff counter associated with the first link in response to the determination that the backoff counter associated with the second link has not reached the predetermined value. In an embodiment, the first backoff counter remains at the predetermined value until the backoff counter associated with the second link reaches the predetermined value.

In yet another embodiment, a first multi-link device is disclosed. The first multi-link device comprises: a first wireless device coupled to a first link; a second wireless device coupled to a second link; the first wireless device coupled to the first link configured to receive a first physical layer conformance procedure (PLCP) protocol data unit (PPDU) over the first link from a second multi-link device; link use capability circuitry configured to control a backoff counter associated with the second link based on the received first PPDU; determine that the second multi-link device which transmitted the first PPDU is arranged to transmit on the second link concurrent with reception on the first link; detect that the backoff counter associated with the second link reaches a predetermined value after the determination that the second multi-link device which transmitted the first PPDU is arranged to transmit on the second link concurrent with reception on the first link; and the second wireless device coupled to the second link configured to transmit a second PPDU on the second link to the second multi-link device based on the determination and the backoff counter reaching the predetermined value.

In another embodiment, a first multi-link device is disclosed. The first multi-link device comprises: a first wireless device coupled to a first link; a second first wireless device coupled to a second link; link use capability circuitry configured to determine that a second multi-link device is arranged to receive a first PPDU over the first link and a second PPDU over the second link that start at a same time; determine that a backoff counter associated with the first link reaches a predetermined value; determine that a backoff counter associated with the second link reaches a predetermined value; and the first wireless device coupled to the first link configured to transmit the first PPDU over the first link and the second first wireless device coupled to the second link configured to transmit the second PPDU over the second link that start at the same time in response to the respective backoff counter of the first link and the second link reaching the predetermined value.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as program code encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method comprising:
   receiving, by a first multi-link device, a first physical layer conformance procedure (PLCP) protocol data unit (PPDU) over a first link from a second multi-link device;
   controlling, by the first multi-link device, a backoff counter associated with a second link based on the received first PPDU;
   determining, by the first multi-link device, based on a link use capability field in a physical layer header of the first PPDU that indicates the second multi-link device which transmitted the first PPDU is arranged to transmit on a second link concurrent with reception on the first link;
   detecting, by the first multi-link device, the backoff counter associated with the second link reaches a predetermined value after the determination that the second multi-link device which transmitted the first PPDU is arranged to transmit on the second link concurrent with reception on the first link; and
   transmitting, by the first multi-link device, a second PPDU on the second link to the second multi-link device in response to the determination and the backoff counter reaching the predetermined value.

2. The method of claim 1, wherein controlling the backoff counter comprises stopping the backoff counter; the method further comprising resuming the backoff counter in response to the determination that the multi-link device which transmitted the first PPDU is arranged to transmit on the second link concurrent with reception on the first link.

3. The method of claim 1, wherein controlling the backoff counter comprises resetting the backoff counter after the backoff counter reaches the predetermined value and before the determination that the multi-link device which transmitted the first PPDU is arranged to transmit on the second link concurrent with reception on the first link.

4. The method of claim 1, wherein controlling the backoff counter comprises not stopping the backoff counter; the method further comprising: detecting, by the first multi-link device, the backoff counter associated with the second link reaches the predetermined value before the determination that the second multi-link device which transmitted the PPDU is arranged to transmit on the second link concurrent with reception on the first link; and transmitting, by the first multi-link device, the second PPDU on the second link in response to the backoff counter associated with the second link reaching the predetermined value and before the determination that the second multi-link device which transmitted the first PPDU is arranged to transmit on the second link concurrent with reception on the first link.

5. The method of claim 1, wherein the link use capability field indicates a link use capability that indicates support for both transmit on the first link concurrent with the reception on the second link and transmit on the first link concurrent with transmit on the second link with different start times.

6. The method of claim 1, a plurality of fields in the physical header further comprises an uplink or downlink indication associated with the first PPDU.

7. The method of claim 1 a plurality of fields in the physical header further comprises an association identification or partial association identification of an access point or mobile station associated with the first multi-link device which transmitted the first PPDU.

8. A method comprising:
   determining, by a first multi-link device, that a second multi-link device is arranged to receive a first PPDU over a first link and a second PPDU over a second link that start at a same time and the second multi-link device does not support transmit on one link concurrent with reception on another link, the determination further based on a link use capability field in a management frame during an association between the first multi-link device and the second multi-link device;
   determining, by the first multi-link device, that a backoff counter associated with the first link reaches a predetermined value;
   determining, by the first multi-link device, that the second link is idle in response to the determination that the backoff counter associated with the first link reaches the predetermined value; and
   transmitting, by the first multi-link device to the second multi-link device, the first PPDU over the first link and the second PPDU over the second link that start at the same time in response to the determination that the backoff counter associated with the first link reaches the predetermined value, the determination that the second link is idle, and the determination that the second multi-link device is arranged to receive the first PPDU over the first link and the second PPDU over the second link that start at the same time and the second multi-link device does not support transmit on one link concurrent with reception on another link, wherein the first PPDU and second PPDU have a same length.

9. The method of claim 8, further comprising determining that the second link is idle based on a channel of the second link being idle after a point coordination function (PCF) interframe space (PIFS) time from the backoff counter associated with the first link reaching the predetermined value.

10. The method of claim 8, further comprising transmitting on the second link is idle based on a network allocation vector (NAV) checking of a primary channel of the second link, a clear channel assessment (CCA) checking on a secondary channel of the second link and the backoff counter associated with the first link reaching zero.

11. The method of claim 8, further comprising after the transmission: determining that the backoff counter associated with the first link reaches the predetermined value; determining that the backoff counter associated with the second link reaches the predetermined value after the backoff counter associated with the first link reaches the predetermined value; determining that the first link is idle in response to the determination that the backoff counter associated with the second link reaches the predetermined value; and transmitting the first PPDU over the first link and the second PPDU over the second link that start at the same time in response to the determination that the backoff counter associated with the second link reaches the predetermined value and the determination that the first link is idle.

12. The method of claim 8, further comprising: determining that the second link is not idle based on the determination that the backoff counter associated with the first link reaches the predetermined value; and transmitting the first PPDU over the first link and not transmitting the second PPDU over the second link based on the determination that the second link is not idle.

13. A first multi-link device comprises:
a first wireless device coupled to a first link;
a second first wireless device coupled to a second link;
link use capability circuitry configured to determine based on a link use capability field in a management frame during an association between the first multi-link device and the second multi-link device which indicates that the second multi-link device is arranged to receive the first PPDU over the first link and the second PPDU over the second link that start at a same time and the second multi-link device does not support transmit on one link concurrent with reception on another link; determine that a backoff counter associated with the first link reaches a predetermined value; and determine that the second link is idle in response to the determination that the backoff counter associated with the first link reaches the predetermined value; and
the first multi-link device comprising circuitry to transmit to the second multi-link device the first PPDU over the first link and the second PPDU over the second link that start at the same time in response to the determination that the backoff counter associated with the first link reaches the predetermined value and the determination that the second link is idle, and the determination that the second multi-link device is arranged to receive the first PPDU over the first link and the second PPDU over the second link that start at the same time and the second multi-link device does not support transmit on one link concurrent with reception on another link, wherein the first PPDU and second PPDU have a same length.

14. The first multi-link device of claim 13, wherein the link use capability circuitry is further configured to determine that the second link is idle based on a channel of the second link being idle after a point coordination function interframe space (PIFS) time from the backoff counter reaching the predetermined value.

15. The first multi-link device of claim 13, is further configured with circuitry to transmit on the second link based on a network allocation vector (NAV) checking of a primary channel of the second link, a clear channel assessment (CCA) checking on a secondary channel of the second link, and the backoff counter associated with the first link reaching zero.

16. The first multi-link device of claim 13, wherein the link use capability circuitry is further configured to after the transmission: determine that the backoff counter associated with the first link reaches the predetermined value; determine that the backoff counter associated with the second link reaches the predetermined value after the backoff counter associated with the first link reaches the predetermined value; determine that the first link is idle in response to the determination that the backoff counter associated with the second link reaches the predetermined value; and transmit the first PPDU over the first link and the second PPDU over the second link that start at the same time based on the determination that the backoff counter associated with the second link reaches the predetermined value and the determination that the first link is idle, wherein which link of the first link and the second link whose backoff counter reaches zero and which link of the first link and the second link determined to be idle toggle between the first link and the second link for each subsequent transmission.

17. A method comprising:
determining, by a first multi-link device, that a second multi-link device is arranged to receive a first PPDU over a first link and a second PPDU over a second link that start at a same time and the second multi-link device does not support transmit on one link concurrent with reception on another link;
determining, by the first multi-link device, that a backoff counter associated with the first link reaches a predetermined value;
determining, by the first multi-link device, that a backoff counter associated with the second link reaches a predetermined value; and
transmitting, by the first multi-link device, the first PPDU over the first link and the second PPDU over the second link that start at the same time in response to the respective backoff counters of the first link and the second link reaching the predetermined value and the determination that the second multi-link device is arranged to receive the first PPDU over the first link and the second PPDU over the second link that start at the same time and the second multi-link device does not support transmit on one link concurrent with reception on another link.

18. The method of claim 17, further comprising: determining that the backoff counter associated with the second link has not reached the predetermined value when the backoff counter associated with the first link reaches the predetermined value; and resetting the backoff counter associated with the first link in response to the determination that the backoff counter associated with the second link has not reached the predetermined value.

19. The method of claim 17, wherein the backoff counter associated with the first link remains at the predetermined value until the backoff counter associated with the second link reaches the predetermined value.

* * * * *